(12) United States Patent
Housley et al.

(10) Patent No.: US 6,981,149 B1
(45) Date of Patent: Dec. 27, 2005

(54) SECURE, EASY AND/OR IRREVERSIBLE CUSTOMIZATION OF CRYPTOGRAPHIC DEVICE

(75) Inventors: Russell D. Housley, Herndon, VA (US); Gregory W. Piper, San Jose, CA (US); Randy V. Sabett, Washington, DC (US)

(73) Assignee: Spyrus, Inc., San Jose, CA (US)

( * ) Notice: Subject to any disclaimer, the term of this patent is extended or adjusted under 35 U.S.C. 154(b) by 0 days.

(21) Appl. No.: 10/077,841

(22) Filed: Feb. 15, 2002

Related U.S. Application Data

(63) Continuation of application No. 09/013,821, filed on Jan. 27, 1998, now abandoned.

(51) Int. Cl.[7] .......................... G06F 12/14; H04L 9/00
(52) U.S. Cl. ...................... 713/189; 713/166; 713/172
(58) Field of Search ............................... 713/189, 164, 713/166, 172

(56) References Cited

U.S. PATENT DOCUMENTS

| | | | |
|---|---|---|---|
| 3,962,539 A | 6/1976 | Ehrsam et al. | 178/22 |
| 4,918,728 A | 4/1990 | Matyas et al. | 380/21 |
| 5,007,089 A | 4/1991 | Matyas et al. | 380/49 |
| 5,802,519 A | 9/1998 | De Jong | 707/100 |
| 5,883,956 A | 3/1999 | Le et al. | 380/4 |
| 5,933,503 A | 8/1999 | Schell et al. | 380/25 |
| 5,988,510 A | 11/1999 | Tuttle et al. | 235/492 |
| 6,005,942 A | 12/1999 | Chan et al. | 380/25 |

OTHER PUBLICATIONS

Menzes et al. "Handbook of Applied Cryptography", CRC Press LLC, 1997, pp. 66-72.

Primary Examiner—Matthew Smithers
(74) Attorney, Agent, or Firm—David R. Graham

(57) ABSTRACT

The invention enables a cryptographic device to be easily, securely and/or irreversibly customized to provide specified cryptographic functionality. For example, the invention can enable easy and secure modification (expansion, reduction or changing) of application code (which interacts with code stored on a cryptographic device) via the exposure of, for example, the mathematical primitive operations available on the cryptographic device. In particular, the invention can enable modification of available cryptographic operations at a relatively high level of programming abstraction, thus enabling such modification to be accomplished relatively easily. Further, the invention can enable the modification to be accomplished in a manner that does not necessitate or allow access by the application developer to other operations of the cryptographic device, thus providing security for the proprietary code and/or cryptographic keys of other persons or entities that may be present on the cryptographic device. The invention can also enable specification of permissible cryptographic characteristics of a cryptographic device from a set of available cryptographic characteristics of the cryptographic device. In particular, such specification can be done (at device fulfillment, for example) in a manner that is irreversible, thus enabling the cryptographic device to satisfy export regulations for cryptographic devices and/or to meet customer requirements for device security.

24 Claims, 2 Drawing Sheets

SECURE, EASY AND/OR IRREVERSIBLE CUSTOMIZATION OF CRYPTOGRAPHIC DEVICE

This application is a CON of Ser. No. 09/013,821 filed Jan. 27, 1998, now abandoned.

BACKGROUND OF THE INVENTION

1. Field of the Invention

This invention relates to cryptographic devices and, in particular, to a cryptographic device that can easily, securely and/or irreversibly be customized to provide specified cryptographic functionality.

2. Related Art

A "cryptographic device" is a device which can be used to perform cryptographic operations on data. Examples of cryptographic operations include key exchange operations, hash operations, digital signature operations, symmetric encryption (secret key) operations, asymmetric (public key) encryption operations, and key wrapping operations (for both symmetric and asymmetric keys). A "cryptographic characteristic" is an attribute of the manner in which a cryptographic operation is performed. An example of a cryptographic characteristic is the length of a cryptographic key. The cryptographic operations and cryptographic characteristics of a cryptographic device are sometimes referred to herein as the "cryptographic functionality" of the cryptographic device. The cryptographic functionality of a cryptographic device can be implemented by a computer processor executing instructions and/or accessing data stored on a data storage device. Herein, such instructions and/or data are sometimes referred to, singly or collectively, as "code."

FIG. 1 is a block diagram of a typical way of producing and using a cryptographic device. Initially, as shown by block 101, a cryptographic device is "produced." As used herein, at the end of "production" of a cryptographic device, the device includes the capability of performing cryptographic operations as described above. After production of the cryptographic device, "device fulfillment" takes place, as shown by block 102. "Device fulfillment," as discussed and illustrated in more detail below, involves modifying the cryptographic device to tailor the cryptographic functionality of the cryptographic device in a specified manner. For example, the operation of a cryptographic device could be restricted so that cryptographic keys longer than a specified length cannot be used in performing cryptographic operations with which those keys are used. After device fulfillment, an application developer develops application code (see also FIG. 3), as shown by block 103, that causes particular cryptographic operations of the cryptographic device to be performed when the cryptographic device is used in an environment for which the application code is developed. For example, to ensure that the user of a cryptographic device is an authorized user, the application code may cause particular verification operations to occur when the cryptographic device is used. Finally, as shown by block 104, the cryptographic device is used in a particular environment to perform cryptographic operations in accordance with the requirements and/or restrictions established during device fulfillment and application development.

It can be desirable for a cryptographic device to be produced so as to provide flexible cryptographic functionality, so that the cryptographic functionality provided by the device can be tailored to accommodate different needs or needs that change over time. However, in some previous cryptographic devices, modification of cryptographic functionality is impossible. In other cryptographic devices, modification of cryptographic functionality is undesirably complex, compromises the security of other aspects of the cryptographic device's operation, or cannot be provided in a manner that enables the cryptographic device to satisfy other criteria (such as export regulations).

For example, a cryptographic operation can include various sub-operations, such as, for example, mathematical "primitive" operations (e.g., addition, subtraction, multiplication, exponentiation), operation(s) used in generating cryptographic keys, operations for establishing the length of particular data and operations for padding particular data. In some situations, an application developer may desire the performance of a cryptographic operation that can be easily implemented by augmenting or revising the code of an existing cryptographic operation of a cryptographic device so that the performance of one or several sub-operations are added to the existing cryptographic operation and/or replace sub-operations already part of the existing cryptographic operation. As shown in FIG. 2, in previous cryptographic devices, the application code 201, in interacting with the code stored on a cryptographic device 200 via an application code interface 202, can only directly access the cryptographic operations 203: the component parts (e.g., mathematical primitive operations 204) of the cryptographic operations 203 have not been accessible apart from the performance of a cryptographic operation. Thus, an application developer cannot produce application code that requires a new cryptographic operation unless all of the code for the new cryptographic operation is downloaded to (i.e., transferred to and stored on) the cryptographic device. As can be appreciated, the undesirability of downloading code for new cryptographic operations to a cryptographic device increases as the number of devices with which the application code may interact increases. Thus, the lack of accessibility to component parts of a cryptographic operation can make development of new application code or modification of existing application code a difficult, time-consuming and costly undertaking.

In some previous cryptographic devices, certain cryptographic characteristics have been established at the time of production of the cryptographic device so that those cryptographic characteristics cannot later be modified (e.g., the cryptographic characteristics are stored in a ROM). Inhibiting the modification of the cryptographic functionality of a cryptographic device can be desirable to ensure that the device will be deemed to satisfy export regulations for cryptographic devices and/or to meet customer requirements for device security. However, such inflexibility limits the utility of any particular cryptographic device. For example, a cryptographic device that has particularly robust cryptographic functionality may be desirable for domestic use, but unacceptable for export to foreign customers, while a cryptographic device having relatively weaker cryptographic capability may be acceptable for export, but unappealing to domestic customers. Thus, if the cryptographic functionality of a cryptographic device cannot be modified, it is often necessary to produce a variety of different instantiations of such cryptographic device that each have different cryptographic functionality designed to satisfy a particular user, users or type of user.

SUMMARY OF THE INVENTION

The invention enables a cryptographic device to be easily, securely and/or irreversibly customized to provide specified cryptographic functionality.

For example, in one embodiment of the invention, a computer readable storage medium includes stored thereon: i) a first set of code (i.e., instructions and/or data) used to perform one or more sub-operations (which can be, for example, one or more mathematical primitive operations); ii) a second set of code, distinct from the first set of code, used to perform one or more cryptographic operations, the second set of code including one or more instructions that cause performance of instructions and/or use of data from the first set of code so that the one or more sub-operations are performed; and iii) a third set of code for allowing and mediating access to the first set of code from a device external to a device of which the computer readable storage medium is part. The computer readable storage medium can be a data storage device or devices that, together with a processor, can be embodied in a cryptographic device to flexibly provide cryptographic operations in the cryptographic device.

This embodiment of the invention enables easy and secure modification (expansion, reduction or changing) of application code via the exposure of, for example, the mathematical primitive operations available on a particular cryptographic device. In particular, this embodiment of the invention enables modification of available cryptographic operations at a relatively high level of programming abstraction, thus enabling such modification to be accomplished relatively easily. Further, this embodiment of the invention enables the modification to be accomplished in a manner that does not necessitate or allow access by the application developer to other operations of the cryptographic device, thus providing security for the proprietary code and/or cryptographic keys of other persons or entities that may be present on the cryptographic device. Additionally, this embodiment of the invention can allow storage of a part of the code for the cryptographic operations that need never change in a small and unmodifiable storage device (ROM), while a part of the code of the cryptographic operations that it may desired to change is stored in a larger and modifiable storage device (EEPROM), thus retaining the capability of modifying the cryptographic operations present on a cryptographic device, while minimizing or eliminating any limitation on the number and/or complexity of the cryptographic operations that can be provided in the cryptographic device.

In another embodiment of the invention, a computer readable storage medium includes stored thereon access permission data, stored in accordance with a predefined data structure, representing an availability of one or more cryptographic characteristics, each cryptographic characteristic enabling or affecting the performance of a cryptographic operation or a mathematical primitive operation by a cryptographic device, the computer readable storage medium having the property that, once a value or values of the access permission data are stored, the value or values of the access permission data cannot be changed. The computer readable storage medium can be a data storage device that, together with one or more other devices for performing cryptographic operations, can be embodied in a cryptographic device to flexibly, but irreversibly, establish cryptographic characteristics in accordance with which the cryptographic operations are performed.

This embodiment of the invention enables specification of permissible cryptographic characteristics of a cryptographic device from a set of available cryptographic characteristics of the cryptographic device. In particular, such specification can be done in a manner that is irreversible, thus enabling the cryptographic device to satisfy export regulations for cryptographic devices and/or to meet customer requirements for device security.

DETAILED DESCRIPTION OF THE INVENTION

Figure 3:
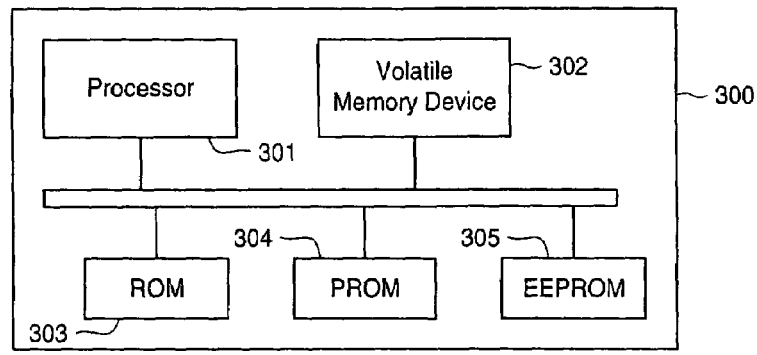
FIG. 3 is a block diagram of a computational device in which a system according to the invention can be implemented.

FIG. 3 is a block diagram of a computational device 300 in which the invention can be implemented. The computational device 300 includes a processor 301, a volatile memory device 302 (e.g., RAM), and several non-volatile memory devices 303, 304 and 305. The processor 301 can be implemented by any processor that has cryptographic processing capability (e.g., that can perform calculations using numbers having a large number of bits). In one particular implementation of the computational device 300, described in more detail hereinafter, the non-volatile memory device 303 is a read-only memory (ROM), the non-volatile memory device 304 is a programmable read-only memory (PROM) in which the data values can be established once and never changed thereafter, and the non-volatile memory device 305 is an electrically erasable, programmable read-only memory (EEPROM). It is to be understood that the computational device 300 also includes other devices (that, for simplicity, are not shown in FIG. 3) that are necessary to enable the computational device 300 to operate as described herein, such as devices that enable communication between the computational device 300 and other devices. Further, in other embodiments, the computational device 300 can include additional devices that perform additional functions or augment existing functions in the computational device 300, such as, for example, special purpose coprocessors (e.g., math coprocessor). The computational device 300 can be embodied by one or more integrated circuit chips including the devices shown in FIG. 3. Illustratively, an integrated circuit chip made by Siemens of Germany and available as part no. SLE44CR80S can be used to implement a cryptographic device in accordance with the invention.

Figure 4:
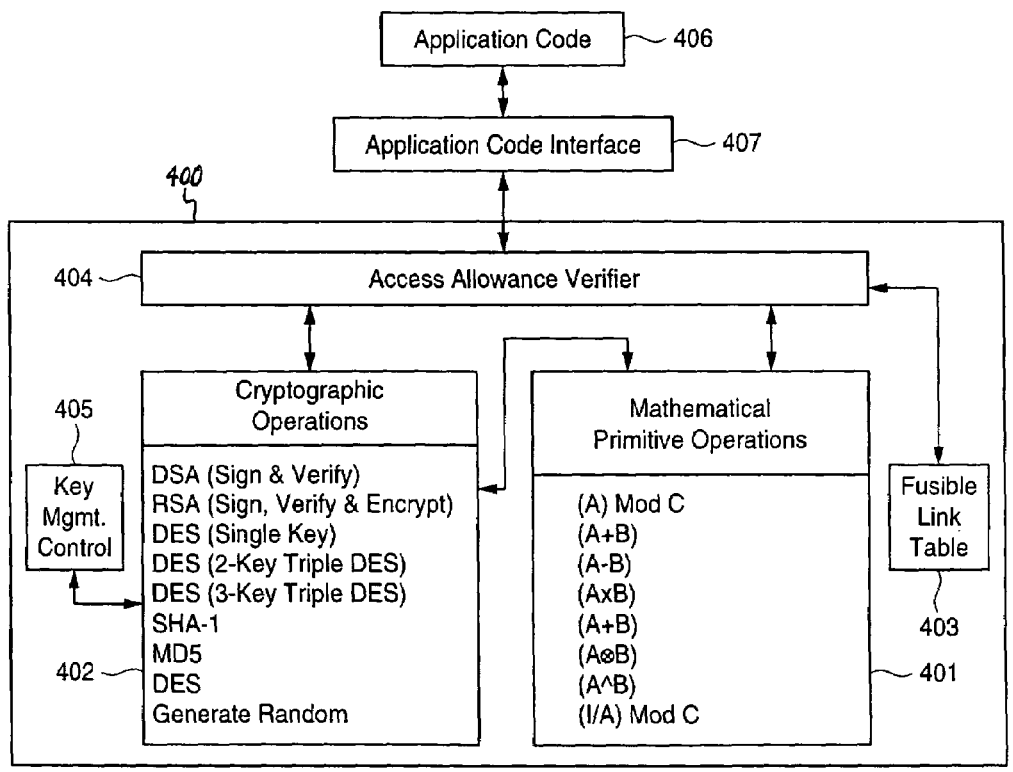
FIG. 4 is a block diagram of a system according to an embodiment of the invention.

FIG. 4 is a block diagram of the functional components of a cryptographic device 400 according to an embodiment of the invention. The block 401 (hereinafter sometimes referred to as "the mathematical primitives storage area") represents instructions and/or data ("code") that enables the performance of one or more mathematical primitive operations. The block 402 (hereinafter sometimes referred to as "the cryptographic operations storage area") represents code that enables the performance of one or more cryptographic operations. In general, the block 402 does not include code that enables the performance of mathematical primitive operations. The block 403 (hereinafter sometimes referred to as "the cryptographic characteristic table") represents data ("access permission data") that specifies cryptographic characteristics in accordance with which one or more of the mathematical primitive operations or cryptographic operations are performed. The block 404 represents code (hereinafter sometimes referred to as "the access allowance verifier") that, using the access permission data, controls access by a user to the mathematical primitive operations and cryptographic operations. Finally, the block 405 represents code (hereinafter sometimes referred to as "the key manager") for storing and accessing cryptographic keys and certificates.

In general, requests by application code 406 for performance of cryptographic operations are received by the access allowance verifier 404 from the application code interface 407. Each request is evaluated by the access allowance verifier 404 to ensure that the request is allowable. Whether a request is allowable is evaluated by comparing the cryptographic characteristics associated with the request to the availability of such cryptographic characteristics, as indicated by the access permission data stored in the cryptographic characteristic table 403. If the request is allowable, then cryptographic operations are performed in accordance with the request, as described further below.

The cryptographic characteristic table 403 can include access permission data that indicate the availability of any desired cryptographic characteristics. For example, such cryptographic characteristics include, but are not limited to, the following characteristics: availability of direct access to one or more mathematical primitive operations, availability of public key encryption, permissible maximum length of public key, permissible maximum length of DES key, and availability of DES key encryption. Table 1 illustrates one example of a cryptographic characteristic table 403 (defined by appropriately establishing the bit values of a byte in a memory device).

TABLE 1

Cryptographic Characteristic Table

| Bit # | Function Controlled |
|---|---|
| b0 | Primitive Crypto Exposure<br>0-Crypto Primitives Available<br>1-Crypto Primitives Not Available |
| b1 | Public Key Limitations<br>0-No Public Key Available<br>1-Public Key Supported |
| b2 | Primitive Public Key Length Limitations<br>0-No Limitations (Key Lengths Up To 1024 Supported)<br>1-512 Bit Maximum Key Length |
| b3 | Operational Public Key Length Limitations<br>0-No Limitations (Key Lengths Up To 1024 Supported)<br>1-512 Bit Maximum Key Length |
| b4 | DES Key Length Limitations<br>0-56 Bit Keys Available<br>1-40 Bit DES Keys Only |
| b5 | Single Key DES Operation Limitations<br>0-DES Available<br>1-DES Not Available |
| b6 | TBD |
| b7 | TBD |

In one embodiment of the invention, one byte is used to establish cryptographic characteristics for asymmetric cryptographic operations and a second byte is used to establish cryptographic characteristics for symmetric cryptographic operations.

Figure 1:
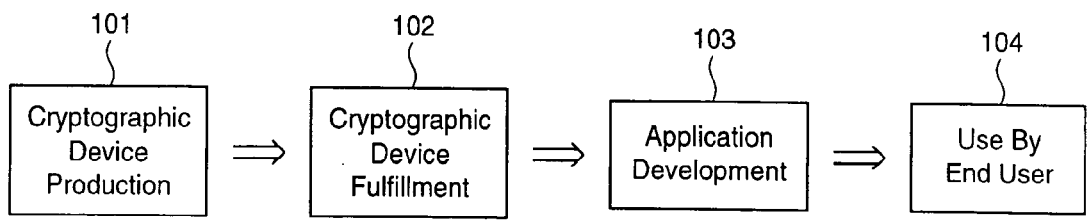
FIG. 1 is a block diagram of a typical way of producing and using a cryptographic device.
Figure 2:
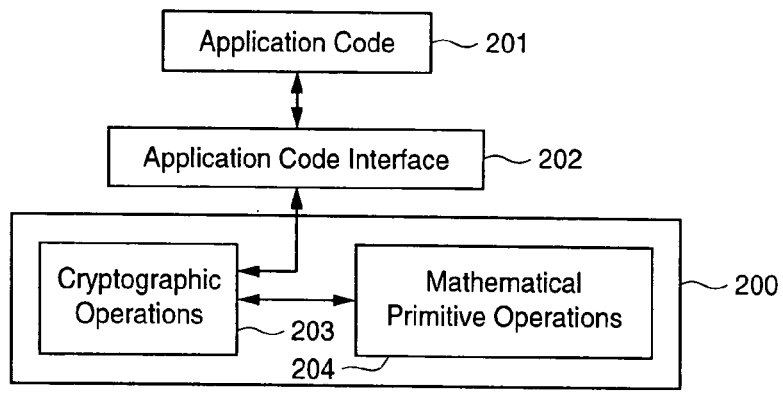
FIG. 2 is a block diagram of a previous cryptographic system.

Preferably, the access permission data of the cryptographic characteristic table 403 are stored in a programmable read-only memory (PROM). The use of such a data storage device enables flexibility in establishing the access permission data (i.e., the availability of cryptographic characteristics) of a cryptographic device, since the access permission data can be established at device fulfillment (see FIG. 1). Thus, a single mass-produced type of cryptographic device can be tailored to meet cryptographic needs for many different applications. Further, the use of such a data storage device enables permanency—and, therefore, security—in establishing the access permission data of a cryptographic device, since once the access permission data are established, the access permission data cannot be changed. Thus, a single mass-produced type of cryptographic device can be tailored to satisfy domestic demand for robust cryptographic capabilities or to conform to export regulations dictating somewhat less robust cryptographic capabilities, while, in the latter case, providing confidence that the limitations on the cryptographic capabilities cannot circumvented once the cryptographic device has been exported to a user.

As indicated above, if the request to the access allowance verifier 404 is allowable, then cryptographic operations are performed in accordance with the request. Execution of the appropriate cryptographic operation stored in the cryptographic operations storage area 402 begins. Typically, at some point, execution of the cryptographic operation will require execution of a mathematical primitive operation. Table 2 illustrates the number of times particular mathematical primitive operations are performed in particular cryptographic operations.

TABLE 2

Construction of Cryptographic Operations from Mathematical Primitive Operations

| Algorithm Primitive | RSA Encrypt | RSA Decrypt | DSA Sign | DSA Verify | Diffie-Hellman |
|---|---|---|---|---|---|
| Exponentiate | 1 | 1 | 1 | 2 | 2 |
| Modular reduce | 1 | 1 | 3 | 5 | 2 |
| Multiply | | | 1 | 3 | |
| Inverse Modulo | | | 1 | 1 | |

As illustrated in FIG. 4, the mathematical primitive operations storage area 401 (i.e., the code that enables the performance of one or more mathematical primitive operations) can be distinct from the cryptographic operations storage area 402 (i.e., the code, other than the code for the mathematical primitive operations, that enables the performance of one or more cryptographic operations, such as code for generating cryptographic keys, establishing the length of particular data and padding particular data). In particular, the mathematical primitive operations code can be made accessible to an applications developer so that the applications developer can directly access the functionality not only of the cryptographic operations, but also of the mathematical primitive operations. Exposing the mathematical primitive operations to the applications developer provides flexibility to the applications developer in creating application code.

For example, to add a new cryptographic operation or modify an existing cryptographic operation, it is not necessary to download to the cryptographic device all of the code necessary to accomplish the cryptographic operation. Rather, since the mathematical primitive operations are already accessible on the cryptographic device 400, the applications developer can provide code at a higher (and simpler) level of abstraction that includes instructions, as necessary, to effect performance of the required mathematical primitive operations.

Providing accessibility to the sub-operations (such as the mathematical primitive operations) of a cryptographic operation can be undesirable, since providing such access may enable access to other operations performed on the cryptographic device, thereby enabling an unscrupulous user of the cryptographic device to obtain proprietary code, cryptographic keys of other persons or entities, or other secret information that is present on the cryptographic device. In particular, providing such access in a portable cryptographic device can be dangerous because physical access to the cryptographic device cannot be controlled, as can be done with non-portable devices by, for example, placing the cryptographic device in a locked room. Thus, in a cryptographic device (and especially in a portable cryptographic device), it is necessary (or at least very desirable) that access to particular code stored on a cryptographic device be provided without compromising the security of other aspects of the cryptographic device's operation.

According to the invention, since the applications code accesses the mathematical primitive operations through the access allowance verifier, the applications code cannot access other operations performed on the cryptographic device. Thus, the user is inhibited from gaining access to proprietary code, cryptographic keys of other persons or entities, or other sensitive information that is present on the cryptographic device.

Additionally, some cryptographic devices (in particular, some portable cryptographic devices, such as portable cryptographic devices including a housing having a smart card form factor) are sufficiently small that the space available for implementing the functionality of the cryptographic device is relatively limited. In such small cryptographic devices, it can be desirable to embody devices for non-volatile data storage (as is typically necessary or desirable for storage of code for cryptographic operations) with a read-only memory (ROM) device or devices, since ROM devices are physically smaller than other non-volatile data storage devices, such as PROM (programmable read-only memory) or EEPROM (electrically erasable programmable read-only memory). (A ROM is typically 5–10 times smaller than a PROM or EEPROM, for example.) However, as the name implies, the data stored in a ROM device cannot be modified once it has been stored. To enable modification of cryptographic operations (by downloading new code to the cryptographic device), one of the physically larger data storage devices, such as an EEPROM, must be used.

In the cryptographic device 400, the mathematical primitive operations storage area 401 can be established within a ROM, since, if all mathematical primitive operations that are reasonably anticipated to be required by a cryptographic operation that may be implemented on the cryptographic device 400 are provided in the mathematical primitive operations storage area 401, the mathematical primitive operations need never be modified. The cryptographic operations storage area 402 can be established within a larger data storage device that is also modifiable (writable), such as an EEPROM. However, since the code for the cryptographic operations stored in the cryptographic operations storage area 402 does not include the code for the mathematical primitive operations, the amount of required data storage space is reduced. Thus, to store the same number and/or complexity of cryptographic operations, a smaller EEPROM can be used than if the code for the cryptographic operations included the code for the mathematical primitives, as has been the case in previous cryptographic devices. In sum, then, the invention stores the part of the code of cryptographic operations that need never change in a small and unmodifiable storage device (ROM), while storing the part of the code of cryptographic operations that a user may desire to change in a larger and modifiable storage device (EEPROM). Consequently, the invention retains the capability of modifying the cryptographic operations present on a cryptographic device, while minimizing or eliminating any limitation on the number and/or complexity of the cryptographic operations that can be provided in the cryptographic device.

In some cryptographic devices, it may also be desirable to store part of the cryptographic operations storage area 402 in a ROM. This may be the case, for example, if there is space in the ROM that would otherwise go unused. This may also be the case when it is known or believed that certain cryptographic operations will be desired by all or most users of the cryptographic device.

Additionally, in other embodiments of the invention, both of the mathematical primitive operations storage area 401 and the cryptographic operations storage area 402 can be established within an EEPROM. However, such embodiments do not offer the advantages associated with using a smaller data storage device (e.g., ROM) to store part of the code for the cryptographic operations.

The mathematical primitives storage area 401 can include any mathematical primitives that can be used in implementing a cryptographic operation. For example, such mathematical primitives include, but are not limited to, the following operations: a mod reduce operation, an add operation, a subtract operation, a multiply operation, a divide operation, an exponentiate operation, an inverse modulo operation, an XOR operation, a DES operation and an random number generator operation. A mod reduce operation performs a modular reduction of a specified input value. The mathematical operation is Y=AmodC. An add operation performs an integer addition operation on two specified operands, and then optionally performs a mod reduction. The mathematical operations are Y=(A+B) and Y=(A+B)modC. A subtract operation performs an integer subtraction of two specified operands, and then optionally performs a mod reduction. The mathematical operations are Y=(A−B) and Y=(A−B)modC. A multiply operation performs an integer multiplication operation on two specified operands, and then optionally performs a mod reduction. The mathematical operations are Y=(A*B) and Y=(A*B)modC. A divide operation performs an integer division operation using two specified operands, and then optionally performs a mod reduction. The mathematical operations are Y=(A/B) and Y=(A/B)modC. An exponentiate operation performs the classic public key operation associated with key agreement, digital signature generation, digital signature verification, and some forms of encryption and decryption. The mathematical operation is Y=($A^B$)modC. An invert modulo operation calculates the multiplicative inverse within a set of positive integers. The inversion operation optionally performs a mod reduction. The mathematical operations are Y=($A^{-1}$) and Y=($A^{-1}$)modC (note: (A*($A^{-1}$)modC=1). An exclusive-or operation performs an exclusive-OR on arbitrarily long operands, and then optionally performs a mod reduction. The mathematical operations are Y=(AB) and Y=(AB)modC. A DES operation will encrypt or decrypt a single block of 64 bits. The DES algorithm is specified in FIPS PUB 46: Y=<u>DES</u> (EDFlag, Key, Block) (note: Y=<u>DES</u> (Decrypt, Key, <u>DES</u> (Encrypt, Key, Y))). A generate random operation will generate a random number or pseudo-random number, i.e., Y=<u>RANDOM</u> ( ).

The cryptographic operations storage area 402 can include any desired cryptographic operations. For example, the cryptographic operations included in the cryptographic operations storage area 402 can include, but are not limited to, the following operations: RSA encrypt, RSA decrypt, DSA sign, DSA verify, 3-key triple DES, Diffie-Hellman and elliptic curve. However, it is emphasized that any other cryptographic operations, including, in particular, cryptographic operations that are developed in the future, can be included in the cryptographic operations storage area 402. It is an important aspect of the invention that any cryptographic operation can be easily implemented in a cryptographic device according to the invention.

The invention can be used with any cryptographic device. For example, the invention can be embodied in portable cryptographic devices shaped and sized in accordance with established smart card specifications (e.g., ISO 7816) or established PCMCIA specifications.

Various embodiments of the invention have been described. The descriptions are intended to be illustrative, not limitative. Thus, it will be apparent to one skilled in the art that certain modifications may be made to the invention as described above without departing from the scope of the claims set out below.

What is claimed is:

1. A cryptographic device, comprising:
   means for performing one or more cryptographic operations; and
   a data storage device or devices for storing access permission data representing the availability of one or more cryptographic characteristics in accordance with which one or more of the cryptographic operations are performed, wherein the data storage device or devices are adapted to enable all of the access permission data of the cryptographic device to be stored in the data storage device or devices after manufacture of the cryptographic device such that once a value or values of the access permission data are stored in the data storage device or devices, the value or values of the access permission data cannot be changed.

2. A cryptographic device as in claim 1, wherein the data storage device is a programmable read-only memory.

3. A cryptographic device as in claim 1, wherein the cryptographic characteristics include one or more of the following: availability of direct access to one or more mathematical primitive operations, availability of public key encryption, permissible maximum length of public key, permissible maximum length of DES key, and availability of DES key encryption.

4. A computer readable storage medium or media of a cryptographic device, the computer readable storage medium or media encoded with instructions and/or data, comprising:
   instructions and/or data for performing one or more cryptographic operations; and
   access permission data stored in accordance with a predefined data structure, the access permission data representing an availability of one or more cryptographic characteristics in accordance with which one or more cryptographic operations are performed by the cryptographic device, wherein all of the access permission data is stored in a storage medium or media after manufacture of the cryptographic device such that once a value or values of the access permission data are stored in the storage medium or media, the value or values of the access permission data cannot be changed.

5. A computer readable storage medium or media as in claim 4, wherein the cryptographic characteristics include one or more of the following: availability of direct access to one or more mathematical primitive operations, availability of public key encryption, permissible maximum length of public key, permissible maximum length of DES key, and availability of DES key encryption.

6. A computer readable storage medium or media as in claim 4, further comprising a programmable read-only memory for storing the access permission data.

7. A cryptographic device, comprising:
   a processor for executing instructions and/or accessing data to perform one or more cryptographic operations that each necessitate the performance of one or more sub-operations;
   one or more data storage devices for storing a first set of instructions and/or data used to perform one or more sub-operations of a cryptographic operation, and a second set of instructions and/or data, distinct from the first set of instructions and/or data, used to perform the one or more cryptographic operations, wherein the second set of instructions and/or data includes one or more instructions that cause performance of instructions and/or access of data from the first set of instructions and/or data so that one or more of the sub-operations are performed; and
   means for allowing access to the first set of instructions and/or data from a device external to the cryptographic device.

8. A cryptographic device as in claim 7, wherein the one or more sub-operations comprise one or more mathematical primitive operations.

9. A cryptographic device as in claim 8, wherein the mathematical primitive operations include one or more of the following: a mod reduce operation, an add operation, a subtract operation, a multiply operation, a divide operation, an exponentiate operation, an inverse modulo operation, an XOR operation, a DES operation and an random number generator operation.

10. A cryptographic device as in claim 7, wherein the cryptographic operations include one or more of the following: RSA encrypt, RSA decrypt, DSA sign, DSA verify, Diffie-Hellman and elliptic curve.

11. A cryptographic device as in claim 7, wherein the first set of instructions and/or data used to perform one or more sub-operations are stored in a read-only memory device.

12. A cryptographic device as in claim 11, wherein at least some of the second set of instructions and/or data used to perform the one or more cryptographic operations are stored in an erasable programmable read-only memory device.

13. A cryptographic device as in claim 12, wherein at least some of the second set of instructions and/or data used to perform the one or more cryptographic operations are stored in a read-only memory device.

14. A cryptographic device as in claim 7, wherein at least some of the second set of instructions and/or data used to perform the one or more cryptographic operations are stored in an erasable programmable read-only memory device.

15. A cryptographic device as in claim 7, further comprising means for controlling access to the first and second sets of instructions and/or data, wherein:
   the means for controlling access to the first and second set of instructions and/or data comprises the means for allowing access to the first set of instructions and/or data; and
   the means for allowing access to the first set of instructions and/or data does not enable access to the second set of instructions and/or data.

16. A new cryptographic device as in claim 7, wherein the means for allowing comprises:

one or more data storage devices for storing access permission data representing the availability of access to the first set of instructions and/or data from a device external to the cryptographic device; and a processor for executing instructions and/or accessing data to evaluate a request from a device external to the cryptographic device, in view of the access permission data, to determine whether the external device is allowed to access the first set of instructions and/or data.

17. A computer readable storage medium or media encoded with one or more computer programs for enabling performance of cryptographic operations, comprising:

a first set of instructions and/or data used to perform one or more sub-operations of a cryptographic operation;

a second set of instructions and/or data, distinct from the first set of instructions and/or data, used to perform the one or more cryptographic operations, wherein the second set of instructions and/or data includes one or more instructions that cause performance of instructions and/or access of data from the first set of instructions and/or data so that one or more of the sub-operations are performed; and a third set of instructions and/or data for allowing access to the first set of instructions and/or data from a device external to a cryptographic device of which the computer readable storage medium or media are part.

18. A computer readable storage medium or media as in claim 17, wherein the one or more sub-operations comprise one or more mathematical primitive operations.

19. A computer readable storage medium or media as in claim 18, wherein the mathematical primitive operations include one or more of the following: a mod reduce operation, an add operation, a subtract operation, a multiply operation, a divide operation, an exponentiate operation, an inverse modulo operation, an XOR operation, a DES operation and an random number generator operation.

20. A computer readable storage medium or media as in claim 17, wherein the cryptographic operations include one or more of the following: RSA encrypt, RSA decrypt, DSA sign, DSA verify, Diffie-Hellman and elliptic curve.

21. A computer readable storage medium or media as in claim 17, further comprising a fourth set of instructions and/or data for controlling access to the first and second sets of instructions and/or data, wherein:

the fourth set of instructions and/or data comprises the third set of instructions and/or data; and the third set of instructions and/or data does not enable access to the second set of instructions and/or data.

22. A cryptographic device, comprising:

a processor for executing instructions and/or accessing data to perform one or more cryptographic operations that each necessitate the performance of one or more sub-operations;

one or more data storage devices for storing a first set of instructions and/or data used to perform one or more sub-operations of a cryptographic operation, and a second set of instructions and/or data, distinct from the first set of instructions and/or data, used to perform the one or more cryptographic operations, wherein the second set of instructions and/or data includes one or more instructions that cause performance of instructions and/or access of data from the first set of instructions and/or data so that one or more of the sub-operations are performed; and means for enabling a third set of instructions and/or data that is distinct from both the first and second sets of instructions and/or data, that is used to perform one or more cryptographic operations, and that includes one or more instructions that cause performance of instructions and/or access of data from the first set of instructions and/or data so that one or more of the sub-operations are performed to, after manufacture of the cryptographic device, be stored on the one or more data storage devices.

23. A cryptographic device as in claim 22, wherein the first set of instructions and/or data used to perform one or more sub-operations are stored in a read-only memory device.

24. A cryptographic device as in claim 22, wherein at least some of the second and/or third sets of instructions and/or data used to perform one or more cryptographic operations are stored in an erasable programmable read-only memory device.

* * * * *